United States Patent [19]

Wittwer

[11] Patent Number: 4,522,666

[45] Date of Patent: Jun. 11, 1985

[54] APPARATUS AND METHOD FOR SEALING CAPSULES BY APPLICATION OF VACUUM AND STEAM THERETO

[75] Inventor: Fritz Wittwer, Lupsingen, Switzerland

[73] Assignee: Warner-Lambert Company, Morris Plains, N.J.

[21] Appl. No.: 440,371

[22] Filed: Nov. 9, 1982

[51] Int. Cl.[3] .............................................. B29C 27/02

[52] U.S. Cl. ........................................ 156/69; 118/50; 118/58; 156/285; 156/294; 156/382; 206/530; 206/807; 206/828; 427/3; 428/916

[58] Field of Search .................... 53/471, 478; 156/69, 156/155, 285, 294, 303.1, 382, 287; 206/528, 530, 532, 534, 807, 828; 426/138; 427/2, 3, 377, 378; 428/916; 118/50, 58

[56] References Cited

U.S. PATENT DOCUMENTS

| | | | |
|---|---|---|---|
| 1,861,047 | 5/1932 | Colton | 206/528 X |
| 3,078,629 | 2/1963 | Besemer et al. | 53/141 X |
| 3,159,546 | 12/1964 | Kane | 106/311 |
| 3,711,939 | 1/1973 | Stoll | 156/382 X |

*Primary Examiner*—Robert A. Dawson

*Attorney, Agent, or Firm*—Alan H. Spencer; Stephen Raines

[57] ABSTRACT

An apparatus for the application of controlled combinations of temperature, vacuum, pressure and time to seal capsules is disclosed. Also described are methods to seal capsules and to enhance the bonding of the sealed capsules.

16 Claims, 12 Drawing Figures

APPARATUS AND METHOD FOR SEALING CAPSULES BY APPLICATION OF VACUUM AND STEAM THERETO

BACKGROUND OF THE INVENTION

1. Field of the Invention

The present invention relates to apparatus and methods for sealing capsules, and particularly to hard shell pharmaceutical capsules having cylindrical, telescopically joinable, coaxial cap and body parts.

2. Description of the Prior Art

The need for tamper-proof capsules seams from the determination that hard shell gelatin capsules containing medicaments are susceptible to tampering by separating the cap and body parts, modifying or adding to the medicaments therein, and rejoining the body and capsule parts. The prior art of U.S. Pat. No. 1,861, 047 has utilized a circular band of hardened gelatin covering the seam between the body and cap part which indicates when the capsule parts have been separated. This procedure is deficient in that tamperers can easily separate the body part from the cap part, modify or add to the medicaments therein, rejoin the capsule and body parts, and reband the rejoined capsule so as to avoid detection of tampering.

A need therefore exists to provide a simple and effective sealed tamper-proof capsule.

SUMMARY OF THE INVENTION

In accordance with the present invention, apparatus and methods for sealing capsules are disclosed. A sealed tamper-proof capsule comprises a hard shell capsule having cylindrical, telescopically joinable, coaxial cap and body parts each having a side wall, an open end and a closed end, the cap and body being adapted to be mutually joined; characterized in that the capsule is sealed by the application of controlled combinations of temperature, vacuum, pressure and time to form a bond between the cap and body parts.

In operation, the hard shell capsule coaxial cap and body parts are telescopically joined and sealed, which makes it more difficult to separate the body part from the cap part for the purpose of tampering.

Accordingly, it is a principal object of the present invention to provide a hard shell tamper-proof capsule having cylindrical, telescopically joinable, coaxial cap and body parts which are bonded together.

Other objects and advantages will become apparent to those skilled in the art from a consideration of the detailed description which proceeds with reference to the following illustrative drawings.

BRIEF DESCRIPTION OF THE DRAWINGS FIG. 1 is a top plan view of a capsule, characterized in that the side wall of body part 1 is completely inserted within the long cap part 2 so that the closed end 3 of the body part 1 presents a minimal exposed outside closed end surface for gripping and withdrawal of the body part 1 from within the cap part 2.

FIG. 2 is a side sectional view of FIG. 1 along line 2—2 showing the overlap of long cap side wall 4 over body side wall 5.

FIG. 3 is a top plan view of a tamper-proof capsule characterized in that the cap part 2 has a locking means of a circumferentially extending ridge 6 or ridges extending inwardly from the inner side wall surface 7 of the cap part 2.

It is to be understood that the circumferentially extending ridge or ridges of this and other embodiments of tamper-proof capsules also include a segmented or discontinuous ridge or ridges so that spaces between the ridge or ridges act as vents to permit air to escape from within the capsule when joined.

FIG. 4 is a side sectional view of FIG. 3 along line 4—4 showing the locking means by mating of the ridge 6 or ridges of the inner surface 7 of the long cap part 2 with a groove 8 or grooves on the outer side wall surface 9 of the body part 1, when the capsule has been telescopically joined.

It is to be understood that the circumferentially extending ridge or ridges of the cap part mating with the groove or grooves of the body part of this and other embodiments of tamper-proof capsules are interchangeable with a circumferentially extending groove or grooves of the cap part mating with a ridge or ridges of the body part.

FIG. 5 is a top plan exploded view of a capsule body 1 having substantially the shape of a cylinder closed at one end 3 and having a reduced diameter in the area of its open end 4; and a long cap part 2 having substantially the shape of a cylinder closed at one end 5 and having an open end 6 opposite therefrom.

FIG. 6 is a side sectional view of the assembled capsule of FIG. 5 showing the free edge of the reduced diameter of the closed end 4 of the body part 1 has moved freely and smoothly within the open end 6 of long cap part 2 so as not to damage the edge of open end 6. When completely joined the reduced diameter of the open end 4 of the body part 1 is in frictional engagement with the closed end 5 of the cap part 2.

FIG. 7 is a top plan exploded view of a capsule showing the body part 1 having substantially the shape of a cylinder closed at one end 3 and a reduced diameter in the area of its open end 4; the long cap part having substantially the shape of a cylinder closed at one end 5 and having a reduced diameter in the area of its open end 6.

FIG. 8 is a side sectional view of the assembled capsule of FIG. 7 showing the reduced diameter of the open end 4 of the capsule body 1 in frictional engagement with the closed end 3 of the long cap part 1, which further impedes separation of and tampering with the joined capsule.

FIG. 9 is a top plan view of a capsule chacterized in that the body part 1 is inserted partly within the short cap part 2.

FIG. 10 is a side sectional view of FIG. 9 along line 9—9 showing the partial overlap of short cap side wall 4 over body side wall 5.

All of the above examples of capsules can be produced on capsule-making machines utilizing dip-molding technology. Such technology involves the forming of hard shell gelatin capsules by dipping of capsule-shaped pins into a gelatin solution, removing the pins from the solution, drying of the gelatin upon the pins, stripping off the gelatin capsule parts from the pins, adjusting for length, cutting, joining and ejecting the capsules.

When the term "gelatin" is used in this specification, gelatin and/or other hydrophilic polymer materials whose properties are pharmaceutically acceptable as capsule materials are also included.

Figure 11:
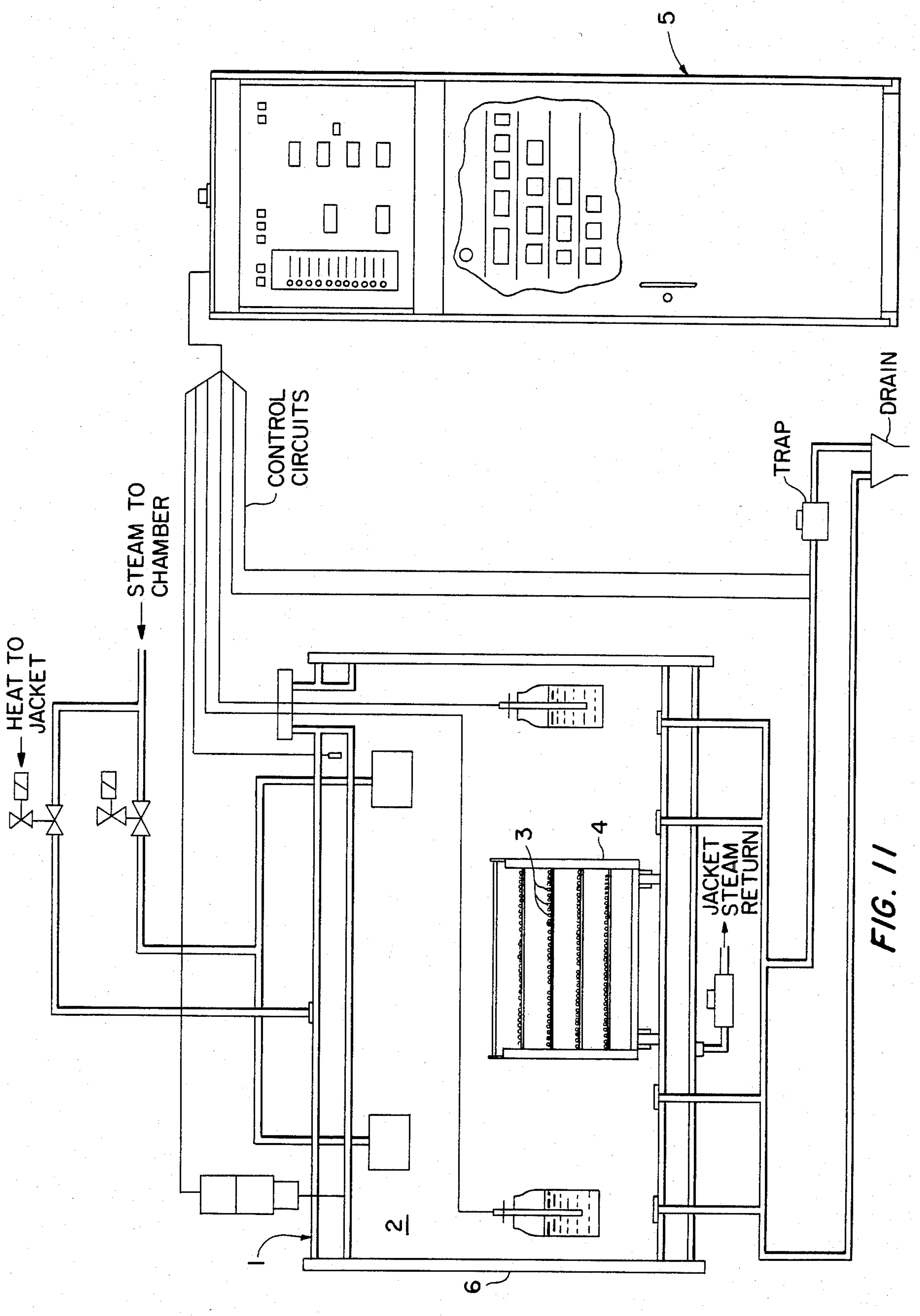
FIG. 11 is a schematic view of an apparatus of the present invention.

In the present invention the capsule is bonded after the capsule has been filled and the capsule parts have been telescopically joined. Thereafter, the sealing of the filled and joined capsule completely impedes separation of the two capsule parts for the purpose of tampering. The sealing of the capsule is accomplished by the method of the present invention which is shown in FIG. 11 as described hereinafter:

A process vessel 1 is shown with a heated-jacketed chamber 2 used in sealing the capsules 3 on a tray-truck 4. The vessel 1 has an automatic controller 5 for control of cycle sequences, including a choice of various temperature-vacuum-pressure-time combinations. The vessel 1 has a door 6 which is held pressure-tight and locked if the pressure in the chamber 2 exceeds 3 psig. The vessel 1 is mounted on the floor or may be mounted in a pit. The vessel 1 may also be arranged for open mounting or for recessing through one wall or two walls.

The chamber 2 withstands full vacuum and pressure in the range between 40 inches of mercury and 30 psig. Plugged ports for controls and facilities for thermocouples are provided. The chamber 2 is piped, valved and trapped for operation with steam. Plugged ports are also provided for steam and air injection into the chamber 2. A vacuum system is included.

The controller 5 provides controls for: temperature indicator-control/recorder; vacuum/pressure indicator-control/recorder; variable exposure times indicator-control/recorder; variable drying times and relative humidity indicator-control/recorder.

Figure 12:
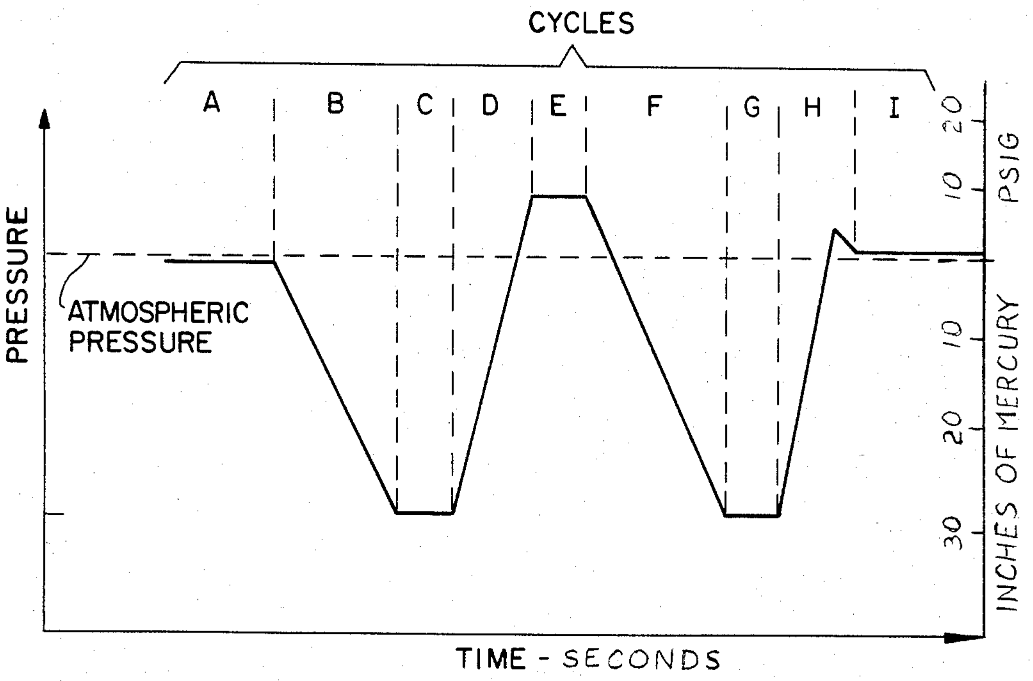
FIG. 12 is a graphic view (not to scale) of the cycles, A to I, of methods of the present invention plotted against ranges of pressure and time. The ranges of pressure and time are dependent upon the sizes of the capsules, and whether they have a short or a long cap.

The methods of the present invention for sealing capsules are shown in FIGS. 11 and 12 and are described as follows:

Cycle A: In this cycle the filled and closed capsules 3 are placed in the chamber 2 as shown in FIG. 11. The walls of the chamber 2 have a temperature range of about 80° to 120° C.

Cycle B: In this cycle the chamber 2 is closed by door 6 and the chamber 2 is evacuated from atmospheric pressure to the following conditions:

Vacuum:

For a short cap capsule (FIGS. 9,10): 2 to 15 inches of mercury, or

For a long cap capsule (FIGS. 1-8): 10 to 26 inches of mercury.

Evacuation time: according to the capacity of the chamber 2 for a time period in the range of 0.5 and 6 minutes.

Cycle C: In this cycle the capsules 3 are exposed to the vacuum level reached in chamber 2 during Cycle B for the following periods of time:

For a short cap capsule (FIGS. 9, 10): 1 to 90 seconds; or

For a long cap capsule (FIGS. 1-8): 0.5 to 3 minutes.

During this cycle the interiors of the joined capsules 3 also reach the same vacuum conditions as the chamber 2.

Cycle D: In this cycle the vacuum in the chamber 2 and within the capsules 3 during Cycle C is broken by the injection of steam or steam and air.

If steam is used, the steam should have the following range of conditions:

92 to 97% saturation;

20 to 50 psig pressure;

100° to 115° C. temperature.

If steam and air are used, the air should be of a quality that is bacteria filtered, and should have the following range of conditions:

15° to 40° C. temperature;

25 to 40% relative humidity.

During Cycle D the chamber 2 may be pressurized between 0 and 10 psig.

Cycle E: In this cycle the pressure level during Cycle E is held for a time range from 1 to 60 seconds in order for the steam or steam and air to enter and melt the hydrophylic polymer within the overlap of the cap and body parts of the capsule 3.

Cycle F: In this cycle the chamber 2 is evacuated within 0.5 to 6 minutes to the following vacuum levels:

For a short cap capsule (FIGS. 9, 10): 2 to 15 inches of mercury; or

For a long cap capsule (FIGS. 1-8): 10 to 26 inches of mercury.

During Cycle F the excess steam is evacuated from within the chamber 2 so that the capsules 3 do not further swell, melt or deform.

Cycle G: In this cycle the capsules 3 are exposed to a vacuum level for a period of time between 1 and 60 seconds so as to evaporate water from the molten hydrophylic polymer within the overlap of the cap and body part of the capsule 3.

Cycle H: In this cycle the vacuum is broken with air having a temperature of 20° to 40° C.; a relative humidity of 20 to 40%; and a pressure of 0 to 2 psig. The pressure is immediately broken to atmospheric pressure (0 psig) in case of a preset pressure. During this cycle the capsules are cooled so as to gel the hydrophylic polymer which forms a bond between the cap and the body part.

Cycle I: In this cycle the capsules are dried to a standard level of water content between 12 and 16% by weight based on the dry gelatin, so that the capsules are ready for shipment and use.

After evacuating steam from the chamber, an additional step to enhance the sealing of the tamper-proof capsules may be to dry the capsules in the chamber or in a separate drier having air circulation under the following conditions:

Temperature range—20° to 40° C.

Pressure range—0 to 5 psig

Relative humidity range—20 to 40%

Time period—5 to 15 minutes

The values for temperature, vacuum, pressure, humidity and time of the methods of the present invention must be adapted to the individual configuration and size of the capsules.

The principles of the methods of the present invention are as follows:

A vacuum is built up within the joined capsule which gives a driving force for steam vapor to enter between the telescoped body and cap part. Thereafter, the steam condenses and melts the gelatin at the inside surface of the side wall of the cap part where it overlaps with the outside surface of the side wall of the body part. As soon as the excess steam vapor is removed from the chamber by vacuum, the condensed vapor is also evaporated from the seam between the overlapping cap and body part whereby the molten gelatin therein gels and provides a tight capsule bond between the overlapping cap and body part.

When the term "steam" is used in this specification, steam generated from water as well as steam generated from water in combination with azeotropes of organic solvents, especially those having pharmaceutically acceptable properties, may be used. Examples of a number of azeotropes suitable for use in the present invention are given in Table 1. Reference: *Handbook of Chemistry and Physics,* Section D1 to D44, 53rd Edition, (1972-73) published by Chemical Rubber Co., Cleveland, Ohio.

TABLE 1

| Components | | Azeotrope | |
|---|---|---|---|
| Compounds | Boiling Point °C. | Boiling Point °C. | Percent Composition |
| (a) Acetic acid | 118.1 | 76.6 | 3.0 |
| (b) Water | 100.0 | | 97.0 |
| (a) Acetonitrile | 82.0 | 76.5 | 83.7 |
| (b) Water | 100.0 | | 16.3 |
| (a) Allyl alcohol | 97.1 | 88.2 | 72.9 |
| (b) Water | 100.0 | | 27.1 |
| (a) 2-Butanol | 99.5 | 88.5 | 68.0 |
| (b) Water | 100.0 | | 32.0 |
| (a) Butyl acetate | 126.5 | 90.7 | 72.9 |
| (b) Water | 100.0 | | 27.1 |
| (a) 1-Butanol | 117.7 | 93.0 | 55.5 |
| (b) Water | 100.0 | | 44.5 |
| (a) Butyl ether | 142.0 | 94.1 | 66.6 |
| (b) Water | 100.0 | | 33.4 |
| (a) Ethyl acrylate | 99.8 | 81.0 | 84.9 |
| (b) Water | 100.0 | | 15.1 |
| (a) Ethanol | 78.5 | 78.2 | 95.6 |
| (b) Water | 100.0 | | 4.4 |
| (a) Ethylbutyl ether | 92.2 | 76.6 | 88.1 |
| (b) Water | 100.0 | | 11.9 |
| (a) Heptane | 98.4 | 79.2 | 87.1 |
| (b) Water | 100.0 | | 12.9 |
| (a) Isopropyl acetate | 89.0 | 75.9 | 88.9 |
| (b) Water | 100.8 | | 11.1 |
| (a) Isopropyl alcohol | 82.3 | 80.4 | 87.8 |
| (b) Water | 100.0 | | 12.2 |
| (a) Methylethyl ketone | 79.6 | 73.4 | 88.0 |
| (b) Water | 100.0 | | 12.0 |
| (a) Methylpropyl ketone | 101.7 | 83.8 | 80.4 |
| (b) Water | 100.0 | | 19.6 |
| (a) Propanol | 97.2 | 88.1 | 71.8 |
| (b) Water | 100.0 | | 28.2 |
| (a) Toluene | 110.6 | 85.0 | 79.0 |
| (b) Water | 100.0 | | 20.2 |
| (a) Vinylbutyl ether | 94.2 | 77.5 | 88.4 |
| (b) Water | 100.0 | | 11.6 |
| (a) Vinyl propionate | 94.9 | 79.0 | 87.0 |
| (b) Water | 100.0 | | 13.0 |
| (a) Allyl alcohol | 97.1 | 80.6 | 31.4 |
| (b) Toluene | 110.6 | | 53.4 |
| (c) Water | 100.0 | | 15.2 |
| (a) Diethylformal | 87.5 | 73.2 | 69.5 |
| (b) Ethanol | 78.5 | | 18.4 |
| (c) Water | 100.0 | | 12.1 |
| (a) Ethanol | 78.5 | 77.1 | 48.3 |
| (b) Ethyl acrylate | 99.8 | | 41.5 |
| (c) Water | 100.0 | | 10.1 |
| (a) Ethanol | 78.5 | 73.2 | 14.0 |
| (b) Methylethyl ketone | 79.6 | | 75.0 |
| (c) Water | 100.0 | | 11.0 |
| (a) Ethanol | 78.5 | 74.4 | 37.0 |
| (b) Toluene | 110.6 | | 51.0 |
| (c) Water | 100.0 | | 12.0 |
| (a) Ethanol | 78.5 | 74.7 | 15.0 |
| (b) Triethyl amine | 89.5 | | 75.0 |
| (c) Water | 100.0 | | 10.0 |
| (a) Isobutyl acetate | 116.5 | 86.8 | 45.5 |
| (b) Isobutyl alcohol | 108.39 | | 23.1 |
| (c) Water | 100.0 | | 30.4 |
| (a) Isopropanol | 82.3 | 75.5 | 13.0 |
| (b) Isopropyl acetate | 89.0 | | 76.0 |

TABLE 1-continued

| Components | | Azeotrope | |
|---|---|---|---|
| Compounds | Boiling Point °C. | Boiling Point °C. | Percent Composition |
| (c) Water | 100.0 | | 11.0 |
| (a) Isopropanol | 82.3 | 73.4 | 1.0 |
| (b) Methylethyl ketone | 79.6 | | 88.0 |
| (c) Water | 100.0 | | 11.0 |
| (a) Isopropanol | 82.3 | 76.3 | 38.2 |
| (b) Toluene | 110.6 | | 48.7 |
| (c) Water | 100.0 | | 13.1 |
| (a) Propanol | 97.2 | 82.2 | 19.5 |
| (b) Propyl acetate | 101.6 | | 59.5 |
| (c) Water | 100.0 | | 21.0 |
| (a) Propyl alcohol | 97.19 | 74.8 | 20.2 |
| (b) Propyl ether | 91.0 | | 68.1 |
| (c) Water | 100.0 | | 11.7 |

Using the apparatus and methods of the present invention, capsules were satisfactorily sealed as shown in the following examples:

EXAMPLE 1

Figure 1:
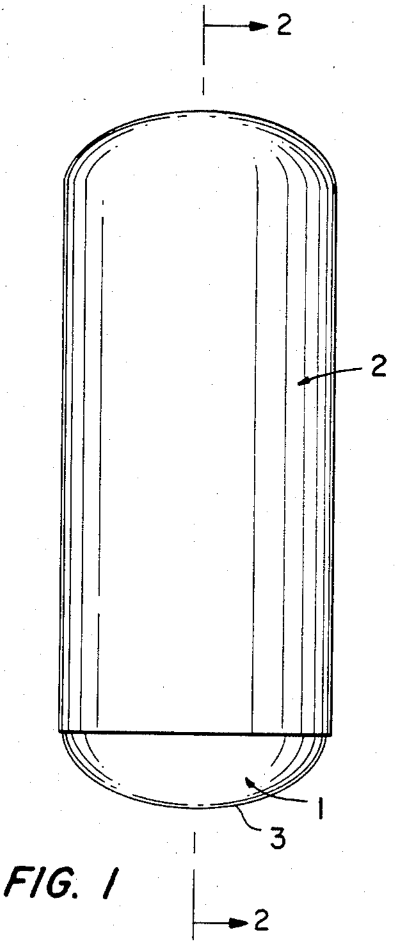
Figure 2:
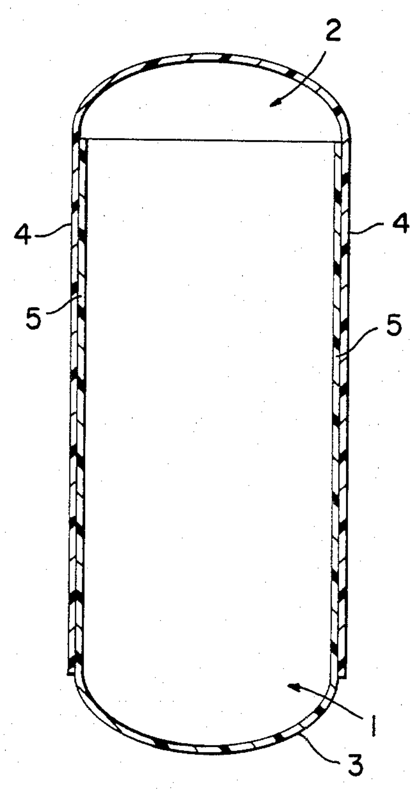
Figure 3:
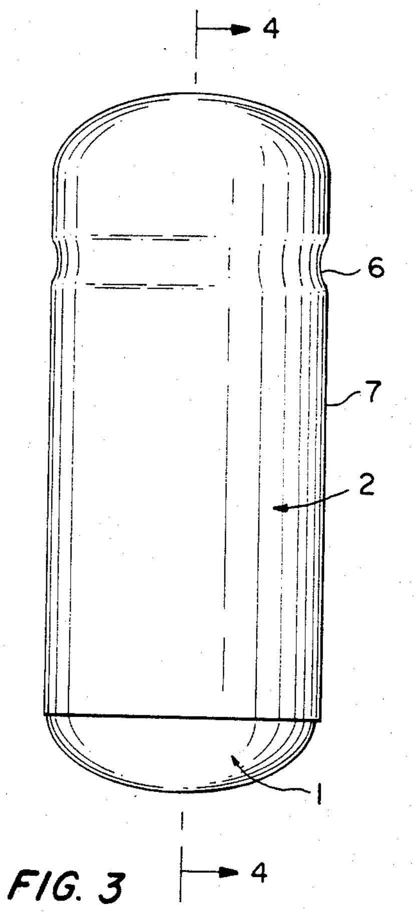
Figure 4:
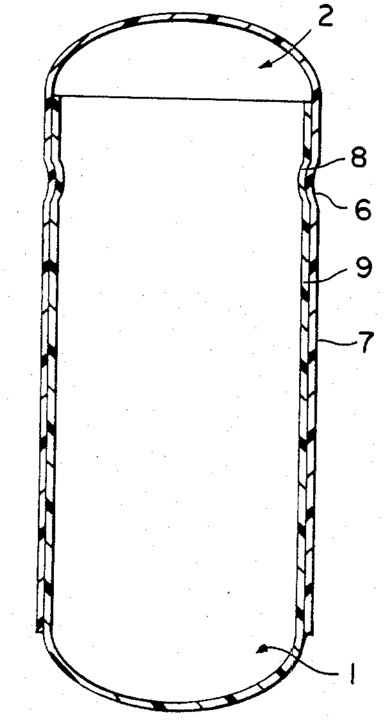
Figure 5:
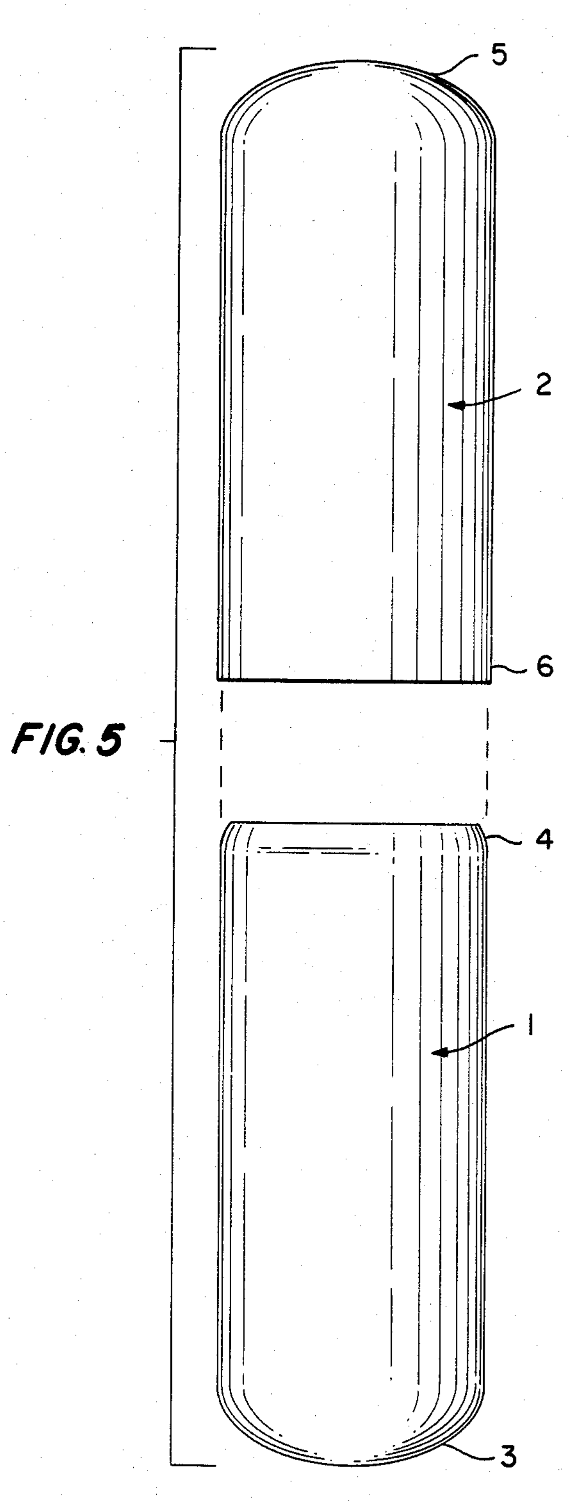
Figure 6:
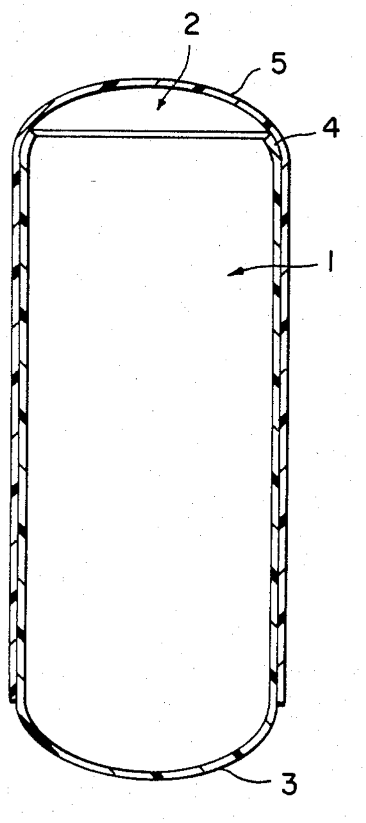
Figure 7:
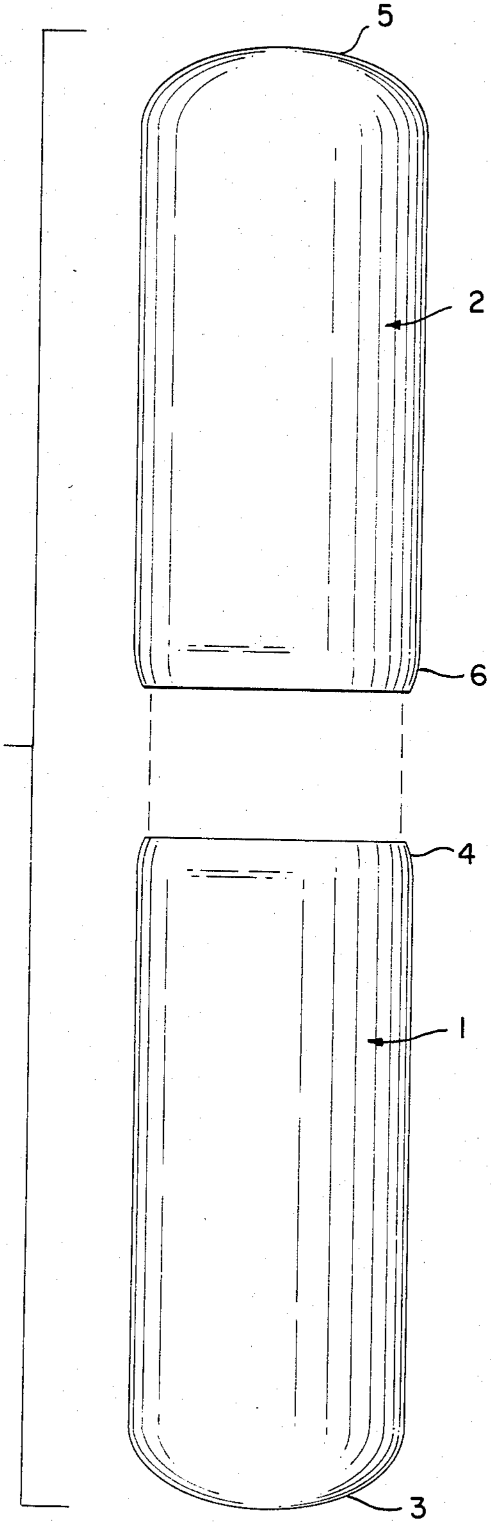
Figure 8:
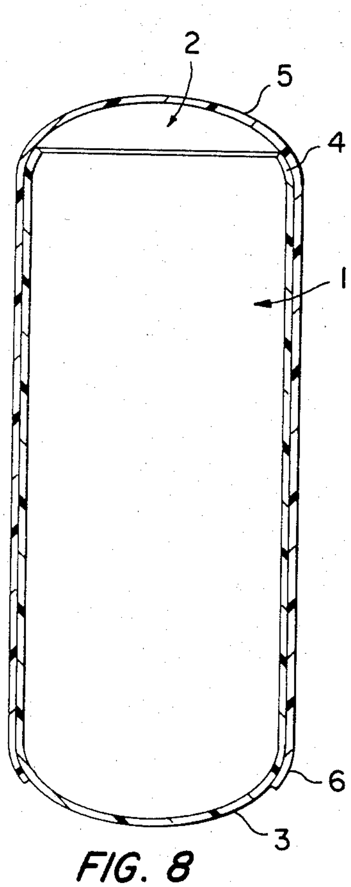
Figure 9:
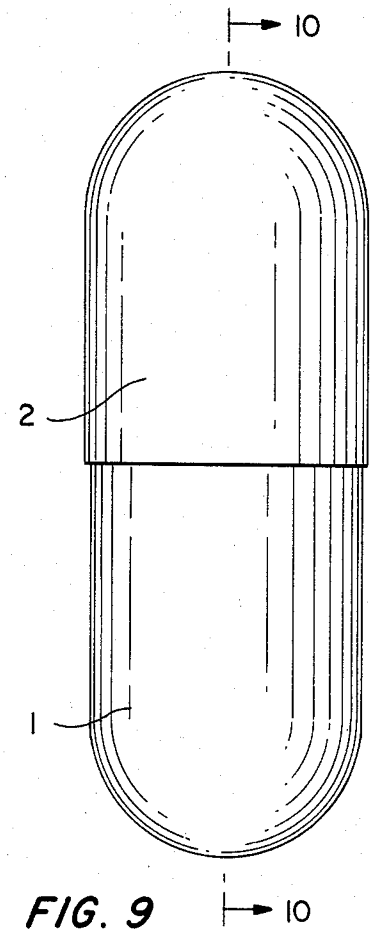
Figure 10:
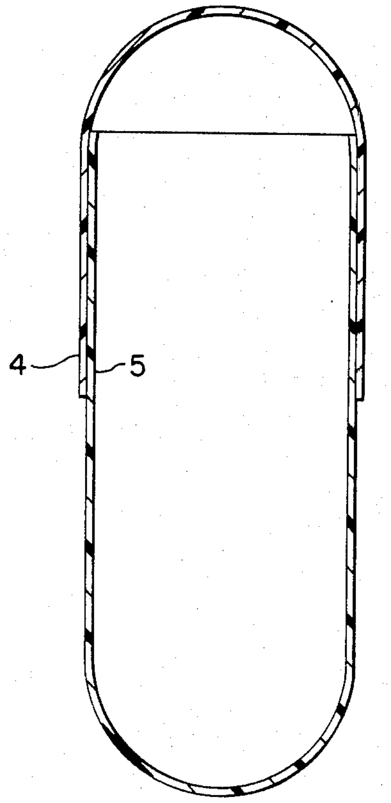

The bottom part of wide open Erlenmeyer flask was covered with filled and closed hard gelatin capsules, size 1, with a short cap as shown in FIGS. 9, 10. The opening of the flask was covered with a filter paper. The flask was then placed in a chamber having a jacket temperature of 105° C. and a volume of 500 $dm^3$.

A vacuum of 10 inches of mercury was made in the chamber within 3.5 minutes. After having maintained the vacuum level of 10 inches of mercury; steam of 95% saturation; a pressure of 20 psig and a temperature of 110° C. was injected into the chamber for a time period of 60 seconds in order to break the vacuum.

The chamber was again evacuated within 3.5 minutes to a vacuum level of 10 inches of mercury in order to remove the excess steam.

Immediately after having reached the vacuum level of 10 inches of mercury, the vacuum was released within 1 minute to atmospheric pressure (0 psig) by air having a temperature of 25° C. and a relative humidity of 35%.

The flask was removed from the chamber and the capsules were dried for 15 minutes under an air ventiliation system at 30° C. and 30% relative humidity.

The capsules in this example were not deformed and had a complete bond. The capsule parts could not be separated without destroying the capsules.

EXAMPLE 2

Filled and joined hard gelatin capsules as shown in FIGS. 1-8 were placed in a jacketed chamber as described in Example 1.

The following conditions of the process cycles were used:

| | | |
|---|---|---|
| Cycle A: | Time: | 60 seconds |
| | Pressure | 0 psig |
| | Temperature of chamber jacket: | 105° C. |
| Cycle B: | Time: | 3.5 minutes |
| | Vacuum: | 10" of mercury |
| | Temperature of chamber jacket: | 105° C. |
| Cycle C: | Time: | 40 seconds |
| | Vacuum: | 10" of mercury |
| | Temperature of chamber jacket: | 105° C. |

-continued

| | | |
|---|---|---|
| Cycle D: | Time: | 60 seconds |
| | Pressure: | Changing from a vacuum of 10" of mercury to a pressure of 7 psig |
| | Temperature of chamber jacket: | 105° C. |
| | Steam: | 97% saturation; 100° C. temperature injected at a pressure of 20 psig |
| Cycle E: | Time: | 10 seconds |
| | Pressure: | 7 psig |
| | Temperature of chamber jacket: | 105° C. |
| Cycle F: | Time: | 3.5 minutes |
| | Vacuum: | Going from a pressure of 7 psig to a vacuum of 15" of mercury |
| | Temperature of chamber jacket: | 105° C. |
| Cycle G: | Time: | 10 seconds |
| | Vacuum | 15" of mercury |
| | Temperature of chamber jacket: | 105° C. |
| Cycle H: | Time: | 60 seconds |
| | Pressure | Going from a vacuum of 15" of mercury to a slight pressure of 1 psig. |
| | Temperature of chamber jacket: | 105° C. |
| | Air conditions: | Temperature 25° C., relative humidity 35% |
| Cycle I: | Time: | 10 minutes |

Capsules were removed from the jacketed chamber and dried under an air circulation system with air of 30° C. and 30% relative humidity.

The capsules in this example were also not deformed and had a complete bond. The capsule parts could not be separated without destroying the capsules.

While there have been described and illustrated several embodiments of the present invention, the scope and working range of the invention shall not be limited by examples given above. The invention comprises as well various changes and modifications which will occur to those skilled in the art.

It is intended in the appended claims to cover all such changes and modifications as fall within the true spirit and scope of the present invention.

What is claimed is:

1. A method for sealing capsules made from hydrophilic polymer, having hard shell coaxial cap and body parts which overlap when telescopically joined, comprising the steps of:

A. placing the capsules within a process vessel having a heated-jacketed chamber;
B. evacuating air from the chamber so as to cause a vacuum therein;
C. exposing the capsules within the chamber for a time period so as to also cause a vacuum within the capsules;
D. injecting steam into the chamber so as to break the vacuum therein and to increase the temperature, relative humidity and pressure within the chamber and within the capsules;
E. melting the hydrophilic polymer by the entry of steam within the overlap of the cap and body parts;
F. evacuating excess steam from the chamber so that the capsules do not swell, melt or deform;
G. exposing the capsules to vacuum within the chamber so as to evaporate water from the melted hydrophilic polymer within the overlap of the cap and body parts;
H. cooling the capsules so as to gel the hydrophilic polymer within the overlap between the cap and body parts thereby sealing the tamper-proof capsules; and
I. drying the capsules to a stable water content for shipment and use.

2. The method of claim 1 wherein the hydrophilic polymer is gelatin.

3. The method of claim 1 where in step A the chamber is heated to a temperature range between about 80° C. to 120° C.

4. The method of claim 1 where in step B the vacuum is in a range between about 2 to 26 inches of mercury for a time period between about 0.5 to 6 minutes.

5. The method of claim 1 where in step C the time period is in a range between about 1 second to 3 minutes.

6. The method of claim 1 where in step D the steam has a range of conditions between about 92 to 97% saturation, between about 20 to 50 psig pressure, and between about 100° to 115° C. temerature.

7. The method of claim 1 wherein step D the steam is a combination of steam and air.

8. The method of claim 1 where in step D the air has a range of conditions between about 15° to 40° C. temperature and 25 to 40% relative humidity.

9. The method of claim 1 where in step E the melting time period is in a range from about 1 to 60 seconds.

10. The method of claim 1 where in in step F the vacuum is in a range from about 2 to 26 inches of mercury.

11. The method of claim 1 where in in step G the exposure to vacuum is in a time period range from about 1 to 60 seconds.

12. The method of claim 1 where in in step H the cooling is in a temperature range between about 20 to 40° C.; a pressure range between about 0 to 2 psig; and a relative humidity range between about 20 to 40%.

13. The method of claim 1 where in step I the capsules are dried to a stable level of water content between about 12 to 16% by weight based on the dry gelatin.

14. The method of claim 13 where in the capsules are dried in a drier having air circulation.

15. The method of claim 1 where in step D the steam is generated from water in combination with azeotropes of organic solvents.

16. Apparatus for sealing capsules made from hydrophilic polymer, having hard shell coaxial cap and body parts which overlap when telescopically joined, comprising a process vessel having a chamber therein for receiving the capsules;

means for evacuating air from the chamber so as to cause a vacuum within said chamber and within the capsules;

means for injecting steam into the chamber so as to increase the temperature, relative humidity and pressure within said chamber and within the capsules, thereby melting the hydrophilic polymer within the overlap of the cap and body parts by the entry of steam within said overlap;

means for evacuating excess steam from the chamber and causing a vacuum within said chamber so that the capsules do not swell, melt or deform, and water is evaporated from the melted hydrophilic polymer within the overlap of the cap and body parts; and means for cooling the capsules so as to gel the hydrophilic polymer within the overlap between the cap and body parts, thereby sealing the capsules.

* * * * *